May 1, 1962 R. PENN 3,032,687
IGNITION APPARATUS FOR INTERNAL COMBUSTION ENGINES
Filed Dec. 28, 1959 2 Sheets-Sheet 1
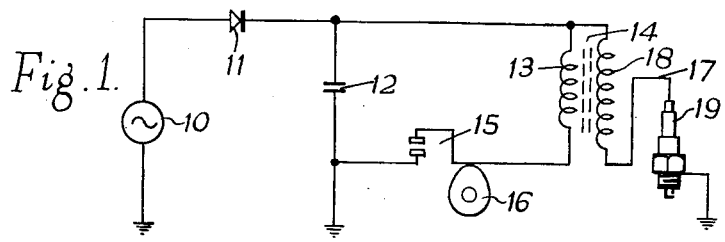
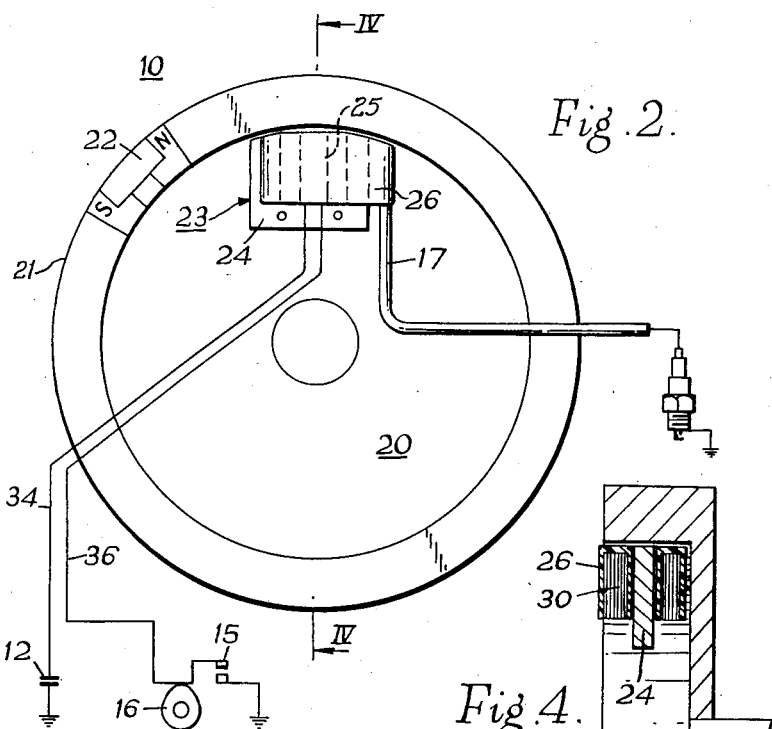
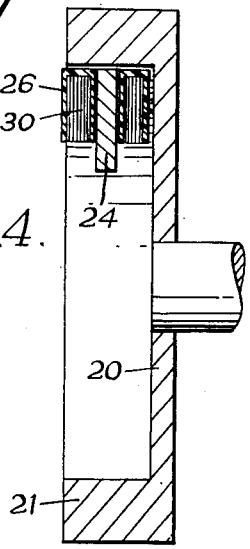
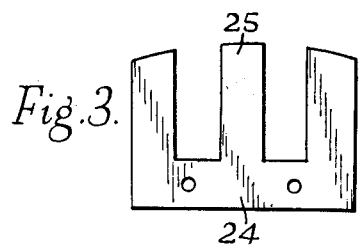
INVENTOR
REGINALD PENN
BY
Craig & Freudenberg
ATTORNEYS

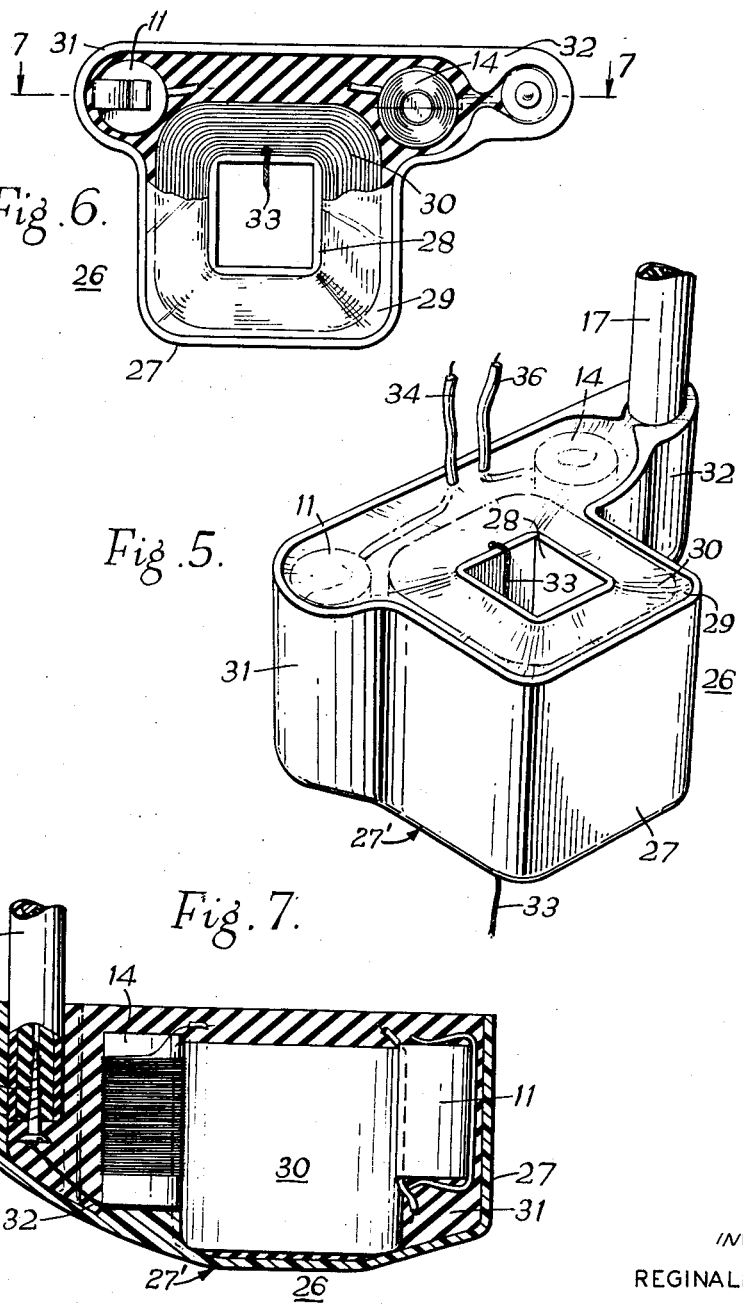

United States Patent Office 3,032,687
Patented May 1, 1962

3,032,687
IGNITION APPARATUS FOR INTERNAL
COMBUSTION ENGINES
Reginald Penn, Bletchley, England, assignor to Wipac
Development Limited, London, England, a British
company
Filed Dec. 28, 1959, Ser. No. 862,402
Claims priority, application Great Britain May 22, 1959
9 Claims. (Cl. 315—206)

The present invention relates to ignition apparatus for internal combustion engines and is concerned with ignition apparatus of the type embodying a capacitor with a rectifier connected in a charging circuit of the capacitor for enabling the system to be energised from an alternator, and a voltage step-up transformer so connected in a discharge circuit of the capacitor as to have its primary winding traversed by the discharge current of the capacitor when contacts in series with the primary winding are made.

For the supply of electrical energy for ignition purposes on engines suitable for motor cycles and small stationary engines use is sometimes made of what is referred to as a flywheel magneto.

This comprises a permanent magnet or magnets mounted upon or in a flywheel co-operating with a stator having a winding provided with a laminated iron circuit. Usually the iron circuit has three poles co-operating with the flywheel and spaced circumferentially thereof, the stator winding being disposed on the centre pole of the three.

The turns in the stator winding are made adequate to provide the necessary ignition voltage.

Examples of flywheel magnetos are described in the specifications of our British Patents Nos. 784,448, 789,031 and our British patent application No. 6104/57.

According to the present invention an ignition system for an internal combustion engine comprises a capacitor provided with a charging circuit in the form of an alternator connected through a rectifier to the capacitor, make-and-break contacts and the primary winding of a radio-frequency voltage step-up transformer connected in series across the capacitor and a sparking plug connected across the secondary winding of the transformer, characterised in that the alternator has a rotor carrying a permanent magnet co-operating with a stator having a plurality of poles, one of the poles having a casing of electrically-insulating material mounted thereon, the casing containing a feed winding and being so shaped as to provide a hollow core for the winding, the hollow core serving to mount the casing on the said one pole, and the casing further containing at least one of the other components of the ignition system other than the sparking plug and the make-and-break contacts.

Thus the casing always houses the A.C. feed winding and at least one other component of the ignition system. The other component will usually be the rectifier which may be in one part or two interconnected parts. Preferably, however, the casing also houses additional components of the ignition system such as the voltage step-up transformer for feeding high tension voltage to the sparking plug and in some instances the capacitor, whereby all the essential elements other than the make-and-break contacts may be housed in the casing giving a compact and readily fitted unit. Usually the spaces remaining in the casing will be filled with sealing and insulating material such as an epoxy resin as commonly used in the "potting" of electrical components. Where, in addition to the A.C. feed winding, the casing houses the rectifier, capacitor and voltage step-up transformer, only two connections need be provided, the remainder being effected by grounding. To ensure a good ground connection it is preferred to provide a braid or a strip of soft metal from a common ground connection in the unit. The strip can be threaded through the hollow core of the feed winding so as to be clamped on the stator pole when the unit is fitted thereto.

The invention will now be described, by way of example, with reference to the accompanying drawings, in which FIG. 1 is a schematic diagram of an ignition system for a single cylinder internal combustion engine, FIG. 2 shows the system of FIG. 1 with an alternator thereof in more detail, FIG. 3 shows a part of a stator of the alternator shown in FIG. 3, FIG. 4 is a section along the line 4—4 of FIG. 2, FIG. 5 is a perspective view of a unit forming part of the alternator shown in FIG. 2, FIG. 6 is an elevation, partly in section, of the unit shown in FIG. 5, and FIG. 7 is a section along the line 7—7 in FIG. 6.

Referring to FIG. 1 an ignition system comprises an alternator 10 with one terminal grounded and the other connected through a rectifier 11 to one plate of a capacitor 12 whose other plate is grounded.

The junction of the rectifier 11 and the capacitor 12 is connected to one terminal of the primary winding 13 of a radio-frequency voltage step-up transformer 14 the other terminal of the primary winding 13 being connected through make-and-break contacts 15 to ground. The make-and-break contacts are operated in conventional manner by a cam 16. The high-tension output lead 17 from the secondary winding 18 of the transformer 14 is connected to a sparking plug 19.

In operation the capacitor 12 is charged from the alternator 10 through the rectifier 11 and each time the contacts 15 close the capacitor is discharged through the primary winding 13 of the transformer 14 and the high voltage induced in the secondary winding 18 of the transformer 14 is applied to the sparking plug 19 and fires the engine.

Referring now to FIGS. 2, 3 and 4 the alternator 10 comprises a rotor 20 having a peripheral flange 21 which carries a permanent magnet 22 embedded therein, the flange being of non-magnetic material. Rotation of the rotor sweeps the magnet 22 past a stator 23 having a three-pole laminated iron structure 24, the centre pole 25 of which carries a feed winding unit 26.

The unit 26 will now be described in detail with reference to FIGS. 5, 6 and 7. It comprises a casing 27 in the form of a one-piece moulding of thermo-setting plastic material and having a generally annular recess 29. From the bottom 27' of the casing recess there is an upstanding, hollow coil core 28 of square cross-section and open at both ends. Surrounding the core 28 and substantially filling the annular recess or channel-shaped space 29 is a winding 30 suitable for use as a feed coil for supplying about 300 volts at normal engine speeds when the feed winding unit 26 is fitted to the stator 23 co-operating with the rotor 20 of FIG. 2. As seen in FIGURES 2, 3 and 7, the bottom 27' of the casing 27 and the ends of the poles of the stator structure 24 present a generally curved surface facing the inner surface of the rotatable peripheral flange 21 of the rotor 20 carrying the permanent magnet 22. As is pointed out hereinafter, it is merely necessary to insert the central pole 25 of the stator into the open end of the core 28 seen in FIGURE 5 to achieve mounting of the unit 26 on the stator.

The outer wall of the casing 27 has two bulges 31 and 32 defining enlarged portions of the recess or channel 29, the bulge 31 containing the rectifier 11 of FIG. 1 and the bulge 32 containing the radio-frequency transformer 14 of FIG. 1. This transformer is preferably as described in the specification of my copending United States patent application Serial No. 862,380, filed December 28, 1959.

One end of the winding 30 is connected to a grounding braid 33 of copper. The other end of the winding 30 is connected through the rectifier 11 to one end of the primary winding of the transformer 14, and to a terminal connection 34.

The transformer 14 is an auto-transformer as shown schematically in FIG. 1, and the high tension output lead from the secondary winding terminates on a threaded spike 35 in the bulge 32.

The other end of the primary winding of the transformer 14 is provided with a terminal connector 36.

When the selected ignition system components of the unit 26 are assembled in the casing 27 the remaining gaps are filled by putting in an epoxy resin.

The unit 26 is assembled as shown in FIG. 2 with the hollow coil core 28 surrounding and supported by the centre stator pole 25. The terminal connector 34 is connected through the capacitor 12 to ground, the terminal connector 36 is connected through the make-and-break contacts 15 to ground, and the high-tension lead 17 is screwed on to the spike 35. Grounding of the winding 30 is effective by means of the braid 33 which lies between the coil core 28 and the stator pole 25 the hollow core being arranged so to fit over the pole 25 as to hold the braid tightly in contact with the pole 25. The braid can alternatively be connected to a ground terminal.

It will usually be preferred to mount the contact breaker and the capacitor on a common mounting as is usual in ignition systems and hence the embodiment described will normally be preferred.

If desired, however, the capacitor may be accommodated in a modified form of the casing whereby the only external components are the make-and-break contacts and the sparking plug.

In some instances, for example, to improve cooling of the rectifier the rectifier may be outside the casing.

Although the transformer 14 is shown as an autotransformer, it can have separate primary and secondary windings.

I claim:

1. An ignition system for an internal combustion engine, comprising a capacitor provided with a charging circuit means including an alternator operatively connected through a rectifier to the capacitor, capacitor discharge means including make-and-break contacts and the primary winding of a radio-frequency, voltage step-up transformer connected in series across the capacitor, and circuit means for connecting a sparking plug across the secondary winding of the transformer, the alternator having a rotor carrying a permanent magnet cooperating with a stator having a plurality of poles, one of the poles having a casing of electrically-insulating material mounted thereon, the casing containing a feed winding and being so shaped as to provide a hollow core for the winding, said one pole extending into said hollow core and serving to mount the casing on the stator, said ignition system comprising as essential elements said capacitor, said rectifier, and said radio-frequency, voltage step-up transformer, and the casing further containing at least one of the other essential components of the ignition system other than the sparking plug and the make-and-break contacts.

2. An ignition system according to claim 1, wherein the casing contains the rectifier and the radio-frequency transformer.

3. A unit for use in an ignition system having an alternator provided with a stator pole, a rectifier, and a radio-frequency, voltage step-up transformer comprising a casing of electrically-insulating material containing a feed winding and being so shaped as to provide a hollow core for said feed winding, said core being open at at least one end thereof to receive the stator pole of said alternator for mounting said unit thereon, the casing further containing said rectifier and said radio-frequency, voltage step-up transformer, and connection means for connecting the feed winding, rectifier and transformer of said unit into said ignition system.

4. An ignition system for an internal combustion engine, comprising as essential components of said ignition system a capacitor, an alternator feed winding, a rectifier, and a radio-frequency, voltage step-up transformer, means for connecting said capacitor in charging relationship to said alternator feed winding through said rectifier, capacitor discharge means including make-and-break contacts and a primary winding of said transformer connected in series across the capacitor, means for connecting an output voltage of said transformer to a sparking plug of said internal combustion engine, an alternator structure including a rotor carrying a permanent magnet and a stator having a plurality of poles past which said permanent magnet is movable, a casing of electrically insulating material mounted on one of the poles of said stator, said casing enclosing said feed winding and at least one of the other of said essential components of the ignition system with said feed winding encircling said one pole.

5. An ignition system according to claim 4, wherein the casing contains the rectifier and the radio-frequency transformer.

6. An ignition system according to claim 4, wherein said casing has a generally annular recess therein within which are located the alternator feed winding and said at least one other of said essential components of the ignition system.

7. An ignition system according to claim 6, wherein the bottom of the casing defining the bottom of said recess presents a generally curved surface facing said rotor.

8. An ignition system according to claim 4, wherein said means for making connection to a sparking plug comprises a screw spike secured to said casing and a high-tension lead screwed on to said spike with the latter penetrating the end of the lead.

9. An ignition system according to claim 4, wherein a potting material embeds the alternator feed winding and those of the essential components in said casing.

References Cited in the file of this patent
UNITED STATES PATENTS 2,469,133    Scott                   May 3, 1949
2,779,898    Smits                   Jan. 29, 1957